United States Patent
Kang et al.

(10) Patent No.: US 9,208,341 B2
(45) Date of Patent: Dec. 8, 2015

(54) SYSTEM AND METHOD FOR SYNCHRONIZING AN ENCRYPTED FILE WITH A REMOTE STORAGE

(71) Applicants: Seon Geun Kang, San Jose, CA (US); Jeong Hwan Park, Seoul (KR)

(72) Inventors: Seon Geun Kang, San Jose, CA (US); Jeong Hwan Park, Seoul (KR)

(73) Assignee: Brainzquare Inc., San Jose, CA (US)

( * ) Notice: Subject to any disclaimer, the term of this patent is extended or adjusted under 35 U.S.C. 154(b) by 76 days.

(21) Appl. No.: 14/048,476

(22) Filed: Oct. 8, 2013

(65) Prior Publication Data

US 2015/0052353 A1  Feb. 19, 2015

(30) Foreign Application Priority Data

Aug. 14, 2013  (KR) .................. 10-2013-0096791

(51) Int. Cl.
*G06F 21/62* (2013.01)
*H04L 29/06* (2006.01)

(52) U.S. Cl.
CPC ........ *G06F 21/6218* (2013.01); *H04L 63/0428* (2013.01)

(58) Field of Classification Search
CPC ............ H04L 63/0428; G06F 12/1408; G06F 21/6218
See application file for complete search history.

(56) References Cited

U.S. PATENT DOCUMENTS

| | | | |
|---|---|---|---|
| 6,742,094 B2 * | 5/2004 | Igari | 711/163 |
| 7,467,407 B2 * | 12/2008 | Yen | 726/20 |
| 8,689,115 B2 * | 4/2014 | Vonog et al. | 715/751 |
| 8,938,790 B2 * | 1/2015 | Kang et al. | 726/9 |
| 2008/0170690 A1 * | 7/2008 | Tysowski | 380/270 |
| 2012/0102317 A1 * | 4/2012 | Mathur et al. | 713/156 |
| 2013/0179676 A1 * | 7/2013 | Hamid | 713/150 |
| 2013/0185562 A1 * | 7/2013 | Kato et al. | 713/171 |
| 2013/0212067 A1 * | 8/2013 | Piasecki et al. | 707/620 |
| 2013/0232121 A1 * | 9/2013 | Tucker et al. | 707/655 |
| 2013/0318347 A1 * | 11/2013 | Moffat | 713/168 |
| 2014/0074719 A1 * | 3/2014 | Gressel et al. | 705/64 |
| 2014/0101434 A1 * | 4/2014 | Senthurpandi et al. | 713/150 |
| 2014/0109242 A1 * | 4/2014 | Chen | 726/30 |
| 2014/0181514 A1 * | 6/2014 | Aoyagi et al. | 713/168 |
| 2014/0379648 A1 * | 12/2014 | Chiu | 707/624 |
| 2015/0121089 A1 * | 4/2015 | Kirikova et al. | 713/193 |

OTHER PUBLICATIONS

Cloud.Me SaltDrive, "Cloud-Enable your USB Flash Drive with SaltDrive Beta, Get Encryption, Automated Data Backup, Expanded Capacity, Collaboration and Much More," Jun. 3, 2012, pp. 1-2.*
Info Security Products Guide, "Preventing Every Major Attack Type on USB Drives," Jun. 5, 2009, pp. 1-3.*
Integral Memory, "What is AES 256-bit hardware-based encryption?," Feb. 3, 2011, pp. 1-3.*
Rajput et al, Designing Secure USB-Based Dongles, Published in EE Times Industrial Control, Dec. 2011, pp. 1-7.*
MegaLockAV, "MegaLock AV User Guide," Document No. UG-CRE-0709-1-0001, Jul. 2009, pp. 1-17.*

* cited by examiner

*Primary Examiner* — Kaveh Abrishamkar
*Assistant Examiner* — James J Wilcox (57) ABSTRACT

A method and system for synchronizing an encrypted file with a remote storage is disclosed. According to one embodiment, a computer-implemented method comprises providing a user with a user application and an encryption key in a portable memory device. The user runs the user application to securely access to a storage on a cloud storage system. A file is encrypted with the encryption key stored in the portable memory device and synchronized with the cloud storage system.

20 Claims, 3 Drawing Sheets

SYSTEM AND METHOD FOR SYNCHRONIZING AN ENCRYPTED FILE WITH A REMOTE STORAGE

CROSS-REFERENCE TO RELATED APPLICATIONS

This application claims priority under 35 U.S.C. §119 to Korean Patent Appl. No. 10-2013-0096791 entitled "SYSTEM FOR SYNCHRONIZING CLOUD STORAGE AND FILES ENCRYPTED WITH AN ENCRYPTION KEY OF THE USER AND THE METHOD" and filed on Aug. 14, 2013, the disclosure of which is hereby incorporated by reference in its entirety.

FIELD

The present disclosure relates in general to the field of computer software and systems, and in particular, to a system and method for synchronizing an encrypted file with a remote storage.

BACKGROUND

Conventional file sharing and distribution mechanisms require delivery of a physical storage medium such as a USB flash drive, or electronic data such as an attachment in an electronic mail. Cloud-based storage systems and services overcome these temporal and spatial restrictions and allow users to access files on a remote storage (e.g., a cloud server, web hard) without such restrictions. Users can store files on the remote storage and conveniently access them over a network as if the files are on their local storage. Cloud storage systems also provide convenient and ubiquitous access to files from various devices (e.g., desktop, laptop, tablet, smartphone) and different locations. Because cloud servers create and store back-up copies of stored files, the cloud-stored files are never lost even when the user's local storage fails.

The primary advances of cloud storage services include sharing of files with other users. However, files stored on a cloud storage are vulnerable to hacking or unauthorized access. This raises security concerns of leaking sensitive information to others. Providing secure access and storage of files is one of the key considerations in designing cloud services and systems.

File encryption provides an added layer of protection to cloud-stored files. However, encrypted files over a cloud storage would suffer inconvenience because an encryption key must be delivered to each user who desires to access the cloud-stored files. An elevated level of scrutiny can be achieved by designing a cloud storage system that prohibits the cloud server from decrypting stored files without the file owner's consent. To this end, a client-side file encryption is desirable, however the implementation of client-side encryption for cloud users poses technical difficulties and inconveniences.

SUMMARY

A method and system for synchronizing an encrypted file with a remote storage is disclosed. According to one embodiment, a computer-implemented method comprises providing a user with a user application and an encryption key in a portable memory device. The user runs the user application to securely access to a storage on a cloud storage system. A file is encrypted with the encryption key stored in the portable memory device and synchronized with the cloud storage system.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A method and system for synchronizing an encrypted file with a remote storage is disclosed. According to one embodiment, a computer-implemented method comprises providing a user with a user application and an encryption key in a portable memory device. The user runs the user application to securely access to a storage on a cloud storage system. A file is encrypted with the encryption key stored in the portable memory device and synchronized with the cloud storage system.

Each of the features and teachings disclosed herein can be utilized separately or in conjunction with other features and teachings to provide a method and system for managing the frequency of online advertisement placements. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

According to one embodiment, the present system and method provides synchronization of encrypted files with a cloud storage system. The present system and method improves the security of shared files between the cloud storage system and a remote client by providing a portable memory medium (e.g., a USB flash memory) that are configured to provide secure access to the cloud storage system.

According to one embodiment, the present system and method delivers an encryption key to a user on a portable memory medium. The encryption key is used to synchronize files that are stored on a dedicated storage on the cloud storage system. The dedicated storage on a cloud storage system: 1) improves secured storage and synchronization of the encrypted file between the cloud storage and a local memory device, 2) provides easy and intuitive sharing and distribution of encrypted files on the cloud storage among users, 3) provides simply authentication and authorization processes, and 4) provides two-factor authentication to allow users' access to the cloud storage using a pre-configured local memory device.

The present system and method improves the security of the encrypted files by providing a mechanism that prevents hacking or an unauthorized access by a cloud storage system operator. The present system and method also performs the authentication between a local memory device and the cloud storage system via an application stored on and run from the local memory device, therefore there is no need to install a client application on the user's computer. Because the application transparently pulls the authentication and encryption information from the memory device, users do not have to provide encryption and authentication information to the cloud storage system every time when synchronizing files between the cloud storage system and the local memory device.

According to one embodiment, the present system and method synchronizes encrypted files on the cloud storage system with a local copy of the encrypted file stored in a user terminal. When connected to the network and an access to the cloud storage system is granted, the present system and method determines whether new files are created on the user's memory device and/or the local copy of the cloud-stored files is updated. Based on the latest file synchronization log and update information, the present system and method determines whether to upload or download the file. For downloading, the encrypted file on the cloud storage system is first decrypted using the user's encryption key (or decryption key) stored on the user's memory device, and then copied to the user's memory device. It is noted that the synchronized file with the cloud storage system is not stored to the local hard drive of the user terminal not to leave unnecessary traces of files (e.g., temporary copies) other than the user's memory device. Once the user's memory device is disconnected, it leaves no traces of the synchronized file. When uploaded, the local copy of the file is encrypted using the user's encryption key and then uploaded to the cloud storage system as an encrypted copy.

According to one embodiment, files stored on the cloud storage system are encrypted with advanced encryption standard (AES) 256 bit encryption. AES256 is an iterative, symmetric-key block cipher that uses a 256 bit encryption key. Because files are synchronized between the memory device and the cloud storage system and stored as encrypted, others who do not have the encryption key cannot decrypt those files. The encryption of files using an encryption key stored on a physical medium (e.g., user's memory device) prevents data leakage by a stolen or lost memory device.

The present system and method requires a configured local memory device to access an encrypted file on the cloud storage system effectuating a two-factor authentication.

According to one embodiment, the present system and method provides a memory device for facilitating synchronization of encrypted files with a cloud storage system. The memory device has a CD region where an application to log in to the cloud storage system; a secured region that is accessible only by the application executed in the CD region; and a hidden region that is used for storing the user's encryption key and authentication information for login for file synchronization between the cloud storage system and the memory device. The encrypted file stored on the cloud storage system is encrypted using the user's encryption key stored in the hidden region of the memory device.

According to one embodiment, the present system and method stores a counterpart of an encrypted file to a memory device that is connected to a user terminal. The encrypted file is downloaded and stored on the memory device as a decrypted copy. After the user is done with viewing/editing the file, the file is again encrypted using the user's encryption key and uploaded to the cloud storage system.

According to one embodiment, a user's memory device contains an authenticated application prior to being distributed to a user. The application is authenticated and configured by an administrator to allow a user application to access the user's encryption key for encrypting or decrypting files when synchronizing with the cloud storage system. The application also accesses the authentication information to gain access to cloud storage system. Once properly configured, the user's memory device provides the user with a transparent yet secured access to the cloud storage system while providing file encryption, decryption, synchronization, and management of files between the cloud storage system and the memory device.

According to one embodiment, the cloud storage system stores encrypted files and manages information regarding authentication, synchronization, and control of memory devices that are configured to be synchronized with the cloud storage system. The cloud storage system creates a dedicated memory storage for an encrypted file to be synchronized with.

A user terminal (also referred to as "assistant" or "user device") refers to a computer system of a user and provides a communication protocol interface to a memory device. The memory device is plugged into the communication port of the user device and the user sets the password to gain access to the memory device. Using a memory device configuration program stored on the memory device, the user can reset or change the password. The administrator can remote reset the password when necessary, or completely destroy the data files stored in the memory device using a control file delivered and executed during synchronization.

The administrator herein refers to the owner of a remote file or another user of the cloud storage system who stores and allows other users to access the remote file. Prior to distributing the remote file to a specified user, the administrator executes an administrator's application from an administrator's device, and configures a memory device, and sends the memory device to the user. During the configuration of the memory device, the administrator's access token is stored in the hidden area of the memory device and a user's application program is stored in the general area of the memory device, respectively. The user executes the application program and gains access to the cloud storage system using the administrator-provided access token. Once the user's application is connected the cloud storage system, synchronization occurs manually or according to a predetermined schedule, and a copy of the remote file is temporarily copied to the secure area of the memory device. The copied file is locally processed by the user and is later synchronized with the remote file on the cloud storage as encrypted according to the synchronization schedule or the user's command.

The administrator's device refers to the computer system that is connected to the cloud storage system locally or over a network and is used to perform a series of steps, for example, managing the administrator's account on the cloud storage system and configuring one or more memory devices.

According to one embodiment, the user device and the administrator's device are one of a desktop, a laptop, a tablet PC, a smartphone, a mobile computer, or a server that is connected wiredly or wirelessly to the cloud storage system over a network.

Figure 1:
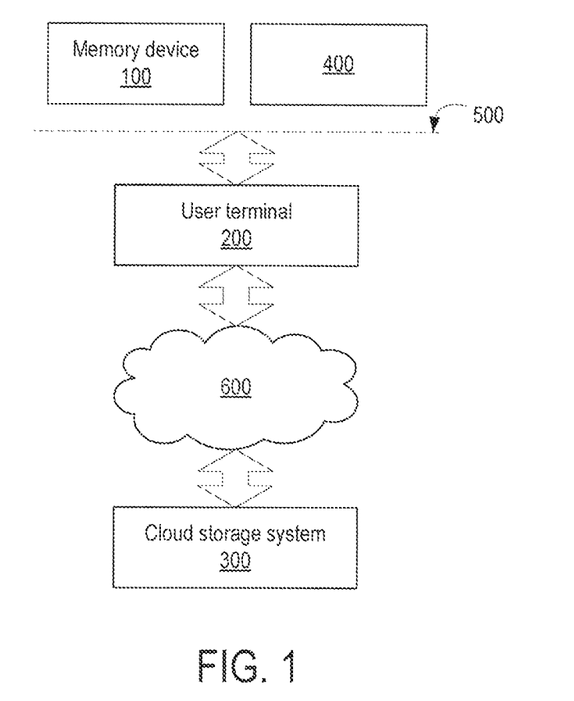
FIG. 1 illustrates an exemplary schematic diagram of the present system, according to one embodiment.

FIG. 1 illustrates an exemplary schematic diagram of the present system, according to one embodiment. The present system includes a memory device 100, an administrator's token 400, a user terminal 200, and a cloud storage system 300. The memory device 100 provides a storage space for storing an encrypted file via the communication interface port 500 (e.g., USB port). The user terminal 200 communicates with the cloud storage system 300 over the network 600 to upload, download, and synchronize files between the memory device 100 and the cloud storage system 300.

According to one embodiment, the memory device 100 is portable and removably connected to the user terminal 200. For example, the memory device 100 is a USB flash drive that is plugged into the user terminal 200 over a USB port. There is a dedicated storage space in the memory device 100 for storing files that are downloaded from the cloud storage system 300 and decrypted using a user's encryption/decryption key. The encrypted file is independently synchronizable with the cloud storage system 300. The encryption process and synchronization process of the encrypted file with the cloud storage system 300 occur independently from each other. The memory device 100 contains both encryption and authentication information, and an application stored in the memory device accesses the information to perform encryption/decryption and synchronization when necessary. According to one embodiment, the encryption and decryption of files occur automatically when uploading to and downloading from the cloud storage system 300, respectively. According to another embodiment, when the application installed in the memory device 100 is run, the authentication to gain access to the cloud storage system 300 occurs without user's interruption or input of authentication information. The procedures of memory device configuration will be discussed below in further detail.

According to one embodiment, the memory device 100 has an AES256 bit encryption chip. The AES256 bit encryption chip is used to encrypt local files (e.g., user application, user's encryption key) on the user's memory device 100. For example, the user-created files or folders are encrypted with a user password and hidden with the encryption chip until a user enters the correct user password to unhide the files and folders. In addition, a user's encryption key (e.g., software encryption key) is used to encrypt files when storing files to the cloud storage system 300. This effectuates a client-side encryption such that the host of the cloud storage system cannot decrypt the stored files without the user's encryption key.

When synchronized with the cloud storage system 300, encrypted files are uploaded to the cloud storage system 300. The encrypted files are downloaded from the cloud storage system 300 and then decrypted using the user's encryption key stored on the user's memory device. The decrypted files are temporarily available on the local memory of the memory device 100 for the user's viewing or editing. When the user is done with viewing and editing, the files are queued for uploading and/or synchronizing with the cloud storage system. The background process launched by the user's providing of the user password to login to the user's memory device continues to run and enable the completion of the uploading and synchronizing.

The present file encryption technique using a user's encryption key stored in a memory device improves the security of files and protects the stored files from a hacker with a malicious intent or even an unauthorized access by a cloud storage system operator. The stored files must be decrypted using the encryption key stored in the memory device 100. Without a physical connection of the memory device 100, the cloud-stored files can neither be properly accessed nor decrypted for viewing or editing. Even in the event of theft or loss of the memory device 100, data stored in the encrypted file is not compromised because the stored files are encrypted by and the memory device 100 must be physically attached to the user terminal 200 to decrypt the encrypted, files. From this respect, the present system provides two-factor authentication requiring physical connection of the memory device to the user terminal 200 and decryption using a user's encryption/decryption key to be able to access files stored in the cloud storage 300.

According to one embodiment, memory device 100 contains a login program and a user-executable application program. When memory device 100 is connected to user terminal 200, the login program is automatically executed or the user executes the program. According to one embodiment, the memory device 100 is password-protected. In this case, the user enters the password for memory device 100, and see files and folders stored in the memory device 100. Among the stored files in the memory device 100, there is a user application that is pre-configured to access to the cloud storage system 300. In another embodiment, the login program automatically runs the user application after the user successfully enters the password. In yet another embodiment, the login program and the user application are integrated into a single application such that the user does not have to manually run the user application after successfully log-in to the memory device 100.

According to one embodiment, the user application is a background process that automatically launches after the user provides the correct password of the memory device. The user application may provide an interface to log-in to the cloud storage system 300. The user application stays running to detect an update (e.g., file read, file write, file save) and determines to encrypt or decrypt files when synchronizing them between the memory device 100 and the cloud storage system 300. The user application terminates itself when the user disconnects the memory device from the user terminal or the user logs out of the memory device 100.

Figure 2:
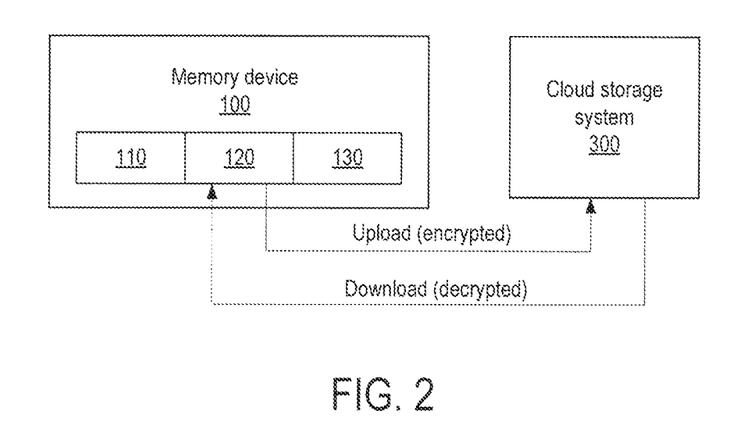
FIG. 2 illustrates a schematic diagram of an exemplary memory device, according to one embodiment.

FIG. 2 illustrates a schematic diagram of an exemplary memory device, according to one embodiment. The memory device 100 has a general area 110, a secure area 120, and a hidden area 130. The general area 110 is accessible by a user without any restriction and stores an application to allow a user to gain access to and synchronize with the cloud storage system 300. In one embodiment, the user logs in to the memory device 100 using a user password and executes the application. The secure area 120 stores files that are synchronized with the cloud storage system 300. For example, an encrypted file is downloaded from cloud storage system 300 during synchronization decrypted using the user's encryption key stored in the memory device 100. Similarly, files stored in the secure area 120 is encrypted the user's encryption key and uploaded to the cloud storage system 300.

The secure area 120 may store both encrypted and decrypted copy of the remote file. For example, when a local copy of a downloaded file is ready for uploading, the local copy is encrypted prior to uploading to the cloud storage system 300. After successful uploading, the local copy of the encrypted file may be deleted. In another example, the local copy is a working decrypted copy available for the user's viewing and editing. Temporary files of the local copy may also be stored in the secure area 120. The AES256 bit encryption may be performed on a hardware chip embedded in the memory device 100 or by an encryption software stored in the memory device 100. Even if the local files are leaked out to an unintended user, such files are not readable or usable without decryption using the encryption chip embedded in the memory device 100.

The hidden area 130 stores authentication information required for accessing the cloud storage system 300. The memory device 100 provides the cloud storage system 300 at least one of, but not limited to, user information, synchronization information, and the authentication information for the user application, and stores information received from the cloud storage system 300 including at least one of, but not limited to, control information for remote controlling of the memory device 100, authentication information for the memory device 100, shared files, and policy information.

The memory device 100 receives a dedicated storage from cloud storage system 300, and synchronizes with the dedicated storage using the authentication and user information. To achieve independence from the user terminal 200 and to prevent copying, saving and printing of the remote file onto the user terminal, temporary and working files of the remote file are forced to be stored on the memory device 100. Those files are synchronized with the dedicated storage of the cloud storage system 300 only via the user application. To launch the user application, the user executes a user executable file (e.g., startup.exe) that is installed in the memory device 100.

In order to synchronize with the cloud storage system 300, the memory device 100 is installed with an appropriate application that is authenticated by an administrator. In one embodiment, the administrator is a user of the cloud storage system. The administrator performs authentication between an administrator's memory device 400 and the cloud storage system 300. The authentication process is described in detail referring to FIG. 3. The authentication information is used to configure the user's memory device 100 to allow the user given the user's memory device 100 to access to the dedicated storage created in the cloud storage system 300.

The administrator herein generally refers to the owner of a remote storage or simply another user of the cloud storage system 300 who manages the access of other users to the remote storage. Prior to distributing the memory device 100 to a specified user, the administrator executes an administrator's application from his/her own device (e.g., administrator's device), and configures the memory device 100. During the configuration of the memory device 100, the administrator's access token to the cloud storage system 300 is stored in the hidden area 130 of the memory device 100 and a user's application program is installed in the general area 110 of the memory device 100, respectively. The user executes the application program and gains access to the cloud storage system 300 using the pre-installed access token. Once the user's application is connected the cloud storage system 300, synchronization occurs according to the predetermined schedule or by a user's command, and a copy of the remote files is temporarily copied to the secure area 120 of the memory device 100. The copied file is decrypted and locally processed by the user and is later encrypted and synchronized with the remote copy on the cloud storage according to the synchronization schedule or the user's command.

The user terminal 200 refers to a computer system that provides a communication protocol interface to the memory device 100. The memory device 100 is plugged into the communication port 500 of the user terminal 200 and the user sets the password to gain access to the memory device. Using a memory device configuration program stored on the memory device 100, the user can reset or change the password. If properly configured so, the administrator can remote reset the password when necessary, or completely destroy the data files stored in the memory device using a control file delivered and executed during synchronization.

The administrator's device refers to a computer system that is connected to the cloud storage system 300 locally or over a network and is used to perform a series of steps, for example, managing the administrator's account on the cloud storage system 300 and configuring one or more memory devices including memory device 100 and administrator's memory device 400.

In one embodiment, the user terminal 200 and administrator's device are structurally and functionally separate. However, it is understood that the user terminal 200 and administrator's device may be the same device to perform their above-described functions without deviating from the scope and spirit of the present invention.

According to one embodiment, the administrator enters a pin code to execute an administrator's application from the administrator's memory device 400. The administrator-provided pin code synchronizes the administrator's memory device 400 with the cloud storage system 300 and authenticates a synchronization application for synchronizing the user's memory device 100 with the cloud storage system 300. Once the synchronization application is authenticated and installed on the user's memory device 100, the user of the memory device 100 does not need to authenticate the synchronization application every time the user application is run.

When the administrator's configuration application is first run, the administrator is asked to enter a password or pin code for the connected token to continue. The administrator's token (e.g., administrator's memory device 400), in one embodiment, is a USB token with an associated password, and it stores the administrator's account log in information to cloud storage system 300. The administrator enters the pin code to execute an administrator's application located in the administrator's token. Upon executing the administrator's application, the administrator's memory device 400 is synchronized with the cloud storage system 300 and the user's application is installed on the user's memory device 100. The user's application is later run by the user to gain access to the cloud storage system 300 and synchronize the user's memory device 100 with the cloud storage system 300.

According to one embodiment, the administrator's token (or memory device 400) refers to a USB token for executing the administrator's application. The authentication information stored on the administrator's memory device 400 is stored to the cloud storage system 300 as encrypted using a user's encryption key.

The administrator's application is run to register the user's memory device 100. For registering the user's memory device 100, the administrator connects the user's memory device 100 to the user terminal 200 (or the administrator's device). For initializing the user's memory device 100, the authentication information stored in the hidden area 130 of the administrator's memory device 400 is copied over to the user's memory device 100. After successful initialization, the authentication information for synchronizing with the cloud storage system 300 is stored on the memory device 100. The user is later given the user's memory device 100 and is allowed to access the cloud storage system 300 using the synchronization application that automatically pulls the authentication information from the user's memory device 100.

The authentication of a user to access the cloud storage system 300 occurs by the user's application stored on the user's memory device 100, therefore the present system and method does not require a user to install and run a client application on user terminal 200 to access the cloud storage system 300. It provides convenience with a user registration or authentication process because user's input of the authentication information is not necessary every time running the user application.

Figure 3:
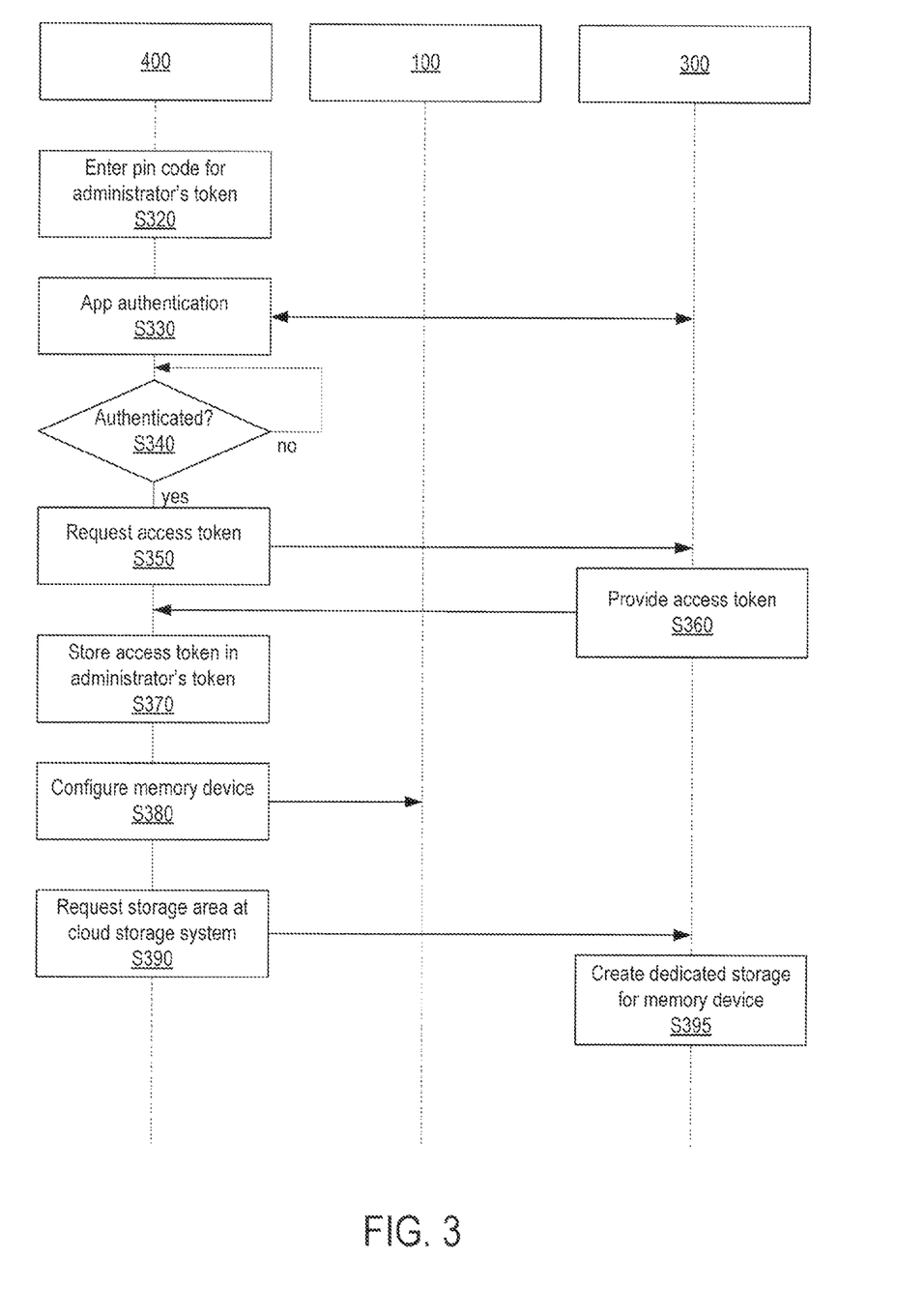
FIG. 3 is an exemplary process for configuring a memory device to synchronize with a cloud storage system, according to one embodiment.

FIG. 3 is an exemplary process for configuring a memory device to synchronize with a cloud storage system, according to one embodiment. The administrator has a token plugged into the administrator's memory device 400 and runs a configuration application. For the first time log-in, the administrator is asked to create a pin code for the administrator's token (S320). If the pin code is already set for the particular token, the administrator enters the previously-set pin code to continue start the configuration application. In one embodiment, the administrator's token is a USB token and stores the administrator's account information on the cloud storage system 300.

The administrator starts configuring the administrator's an account at the cloud storage system 300. The configuration application sends a request to the cloud storages system 300 to authenticate the application (S330). In response, the cloud storage system 300 creates and sends an authentication URL back to the configuration application. The authentication URL is only valid for a predetermined time.

Once the administrator's authentication request is successfully approved and confirmed (S340), the configuration application requests the cloud storage system an access token (S350). According to one embodiment, the access token is sent to the cloud storage system in OAuth protocol. OAuth protocol is commonly used in the art and allows users to share their photos, videos, etc. stored on one site with another site without having to hand out their credentials. By storing the access token locally on the administrator's token, the administrator can access the administrator's account on the cloud storage system without supplying the ID and password. Similarly, as it will be discussed in further detail below, other users are given a memory device that stores the access token so that they access the administrator's account on the cloud storage system without supplying the administrator's ID and password.

The cloud storages system 300 creates and sends the access token for the administrator's account back to the administrator's device 400 (S360). The access token is stored on the administrator token (S370).

Once the access token is successfully stored on the administrator's token, the memory device 100 is connected to the administrator's device (or user terminal 200) over the communication port 500. The memory device 100 is configured by running the administrator's application. The configuration involves, among other things, copying the access token to the hidden area 130 of the memory device 100 (s380). After the configuration of the memory device 100 is completed, the administrator's application further requests a storage area dedicated for the memory device 100 (s390). In response, the cloud storage system 300 creates a dedicated storage for the memory device 100 (s395).

Figure 4:
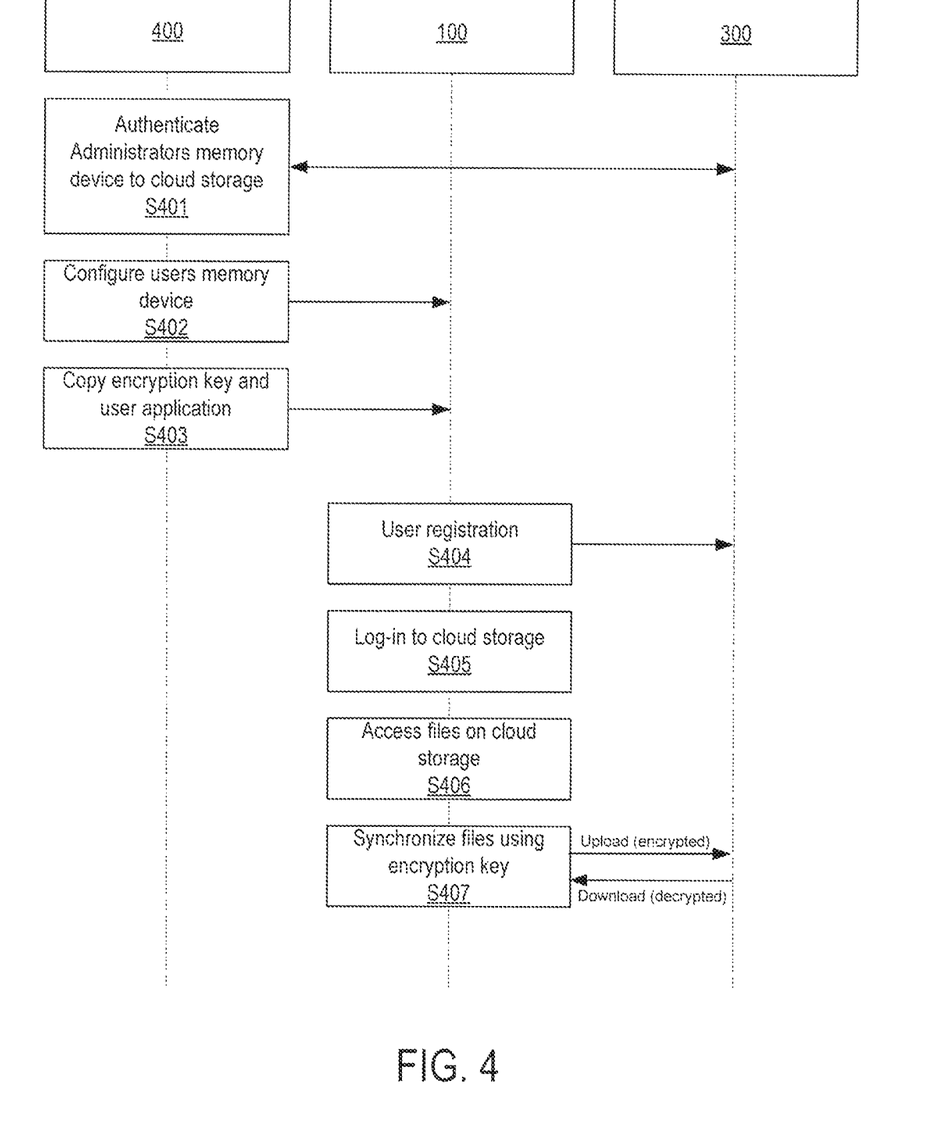
FIG. 4 illustrates an exemplary process for synchronizing an encrypted file with a cloud storage system, according to one embodiment.

FIG. 4 illustrates an exemplary process for synchronizing an encrypted file with a cloud storage system, according to one embodiment. The administrator is an account owner of the cloud storage system 300 and performs the initial authentication (s401). For an initial authentication, the administrator executes an administrator's application stored on the administrator's token to perform synchronization authentication between the user's memory device 100 using the administrator's account on the cloud storage system 300.

For initial registration of a user, the administrator run the administrator's application to register the user's memory device 100. When the user's memory device 100 is connected to administrator's computer or a remote terminal that the administrator's computer can access (e.g., user terminal 200 connected to the administrator's computer over a network), the administrator copies (via the administrator's application) the authentication information (including the account owner's authentication information to access the cloud storage system 300) to the user's memory device 100 from the administrator's token (s402).

According to one embodiment, the administrator generates an encryption key and copies it to the user's memory device along with a user application (s403). The user application applies the encryption key for encrypting files when synchronizing with the cloud storage system. A user given the user's memory device 100 connects the user's memory device 100 to a user terminal 200. For the first time use of the memory device 100, the user registers with the cloud storages system 300 (s404). The user runs the user application installed on the memory device for accessing the cloud storage system 300. Using the authentication information stored on the user's memory device 100, the user application logs in to the cloud storage system 300 (s405) and gains access to a storage space on the cloud storage system 300 (s406). The user application starts a background process and start monitoring an update to the files stored in the cloud storage system 300 as well as local drives on the memory device 100. When an update is detected, the affected files are synchronized (s407). Files that are stored on user's memory device 100 are encrypted and uploaded to the cloud storage system 300 (s407). On the other hand, files that are downloaded from the cloud storage system 300 are decrypted and stored locally on the user's memory device 100 (s408).

According to one embodiment, the present system and method enables intuitive file sharing with encryption among multiple users. Each of the users are given a respective memory device installed with the same encryption key that the administrator created. Because the same encryption key is used for file encryption, each user can access the cloud-stored files as if they are not encrypted. The user application installed on each of the user's memory device provides seamless and transparent access to the cloud storage system 300.

In one embodiment, the encryption key may be changed after the distribution of the memory device. An administrator's application may be installed on the memory device so that the user can launch it locally to change the encryption key. Since the encryption key is stored in the hidden area of the memory device, it is not visible or accessible without the administrator's application. For file sharing, once the encryption key is changed, other user's memory device having the old encryption key can no longer access new files that are encrypted with the new encryption key. In one embodiment, the user application that are originally installed in each user's memory device may run a background process to detect the change of the encryption key so that it can ask for an update from the cloud storage system. The user application notifies such a change to the user when it detected an update of the encryption key. In another embodiment, the change of the encryption key is not allowed but multiple encryption keys may be used. The user application properly applies the correct encryption key to synchronize with the cloud-stored files.

As a part of administrator's configuration for file distribution and/or sharing, the cloud storage system creates a storage space dedicated for a memory device to be synchronized. The memory device stores a local copy of the remote file and the user-specific information to allow the user to obtain secure access to the dedicate storage space on the cloud storage system. The memory device also stores the control information at a designated area to allow the administrator to remotely control and manage the memory device.

Prior to the first time use of a memory device 100, the administrator configures the memory device 100 with the access information to the cloud storage system 300 and user information of the intended user. During the configuration of the memory device 100, the access information to the cloud storage system 300 is stored on the hidden area 130 of the memory device 100. The administrator runs an administrator's configuration application from administrator's device 400. The configuration application may be distributed to the administrator on a portable medium or available for download from the Internet. According to one embodiment, the administrator is required to plug a token (administrator's token different from the memory device 100) in a USB port of the administrator's device 400 to be able to properly configure the memory device 100. According to another embodiment, the administrator may not need any physical hardware to properly configure memory devices and manage a plurality of users through the cloud storage system 300. It is understood that the use of an administrator's token is for convenience and added security, but is not considered to be a limitation of the present invention. The requirement of a token provides several advantages. For example, the administrator gains automatic access to his/her account without entering his/her ID and password (when the memory device is configured so), and the administrator's role can be switched to another person only with the administrator's token and its password (without revealing the account ID and password).

The administrator manages his/her account on the cloud storage system 300 as well as a plurality of memory devices 100. According to one embodiment such memory devices are Secudrive® manufactured by Brainzsquare Co., LTD, of Republic of Korea. When the administrator's account is properly configured, the access information to the cloud storage system 300 is stored on the token, and the hierarchical folders are created on the administrator's account for the memory device management. The processes for administrator/user account set-up and file management schemes are discussed in further detail below.

When the administrator's configuration application is first run, the administrator is asked to enter a password or pin code for the connected token to continue. The administrator's token, in one embodiment, is a USB token with an associated password, and it stores the administrator's account log in information to cloud storage system 300.

The administrator's token provides improved security and an additional layer of authentication yet providing flexibility of switching administrator's role from one person to another without requiring sharing or changing the administrator's account ID and password on cloud storage system 300. For example, one administrator's account may be associated with an administrator token. The administrator's login information to the cloud storage system may not need to be transferred to a new administrator's account because the login information is securely stored in the administrator's token. The new administrator gains a secure access to the original administrator's account simply by entering the pin code set by the original administrator, then access to the administrator's account is automatically granted. The requirement for a physical hardware, i.e., a USB token, and a matching pin code provides both security and flexibility for managing the administrator's account. However, as discussed above, it is noted that the requirement for an administrator's token is not considered to be a limitation of the present invention. The administrator's account may be accessed using a conventional password to cloud storage system 300 without requiring a hardware token.

The administrator's device 400 requests authentication for the administrator's configuration application to cloud storage system 300. In response, cloud storage system 300 sends the results of administrator's request for the authentication. If the authentication was approved, the administrator's device stores the received authentication information on the administrator's token. The authentication information is later used to configure a memory device. During the configuration of the memory device, the authentication information is stored on the hidden area 130 of memory device 100 along with the user information of a specified user to allow the user to access the storage on cloud storage system 300 dedicated for the specified user.

According to one embodiment, the present system and method provides an administrator's configuration application program for configuring his/her account on the cloud storage system 300 and memory devices 100. The administrator's configuration application needs to be pre-approved by the cloud storage system/service provider to be able to configure a memory device for a remote user.

According to one embodiment, the cloud service provider is Dropbox, Inc of San Francisco, Calif., and the cloud storage system is DropBox®. Dropbox users installs a client program on his/her PC, and it creates a Dropbox folder. Dropbox service allows users to share files conveniently and concurrently with other users. However, the shared files could be leaked by other users on purpose or by mistake. The present system and method provides a solution to protect intentional data leakage. A secure desktop is required to run to be able to access the administrator's Dropbox folder and files therein. The secure desktop allows a user to synchronize the file in Dropbox to his/her memory device while the secure desktop is running. The secure desktop runs in isolation and independently from the user's computer. The user is allowed to work on the shared files locally only via the secure desktop and the associated memory device. After completing tasks, the remote files are synchronized with the Dropbox folder.

In order to configure a memory device 100 for file sharing as discussed above, administrator's device 400 first sends a request to the cloud storage system 300 to create a dedicated storage specific for the designated memory device 100. The dedicated storage is reserved for the associated memory device 100, and those stored files are synchronized with the secure area 120 and hidden area 130 of the memory device 100.

According to one embodiment, the present system and methods allows access to one user account (e.g., administrator's account) of cloud storage system 300 by multiple users with the same account credential. From the cloud server's point of view, only one user logs in, sometimes simultaneously from different clients at a time because the administrator and every user uses the same administrator's login credential. The one (administrator) user's account is configured to provide uniquely allocated storage space to each of the memory devices under the administrator's account. Due to this hierarchical folder structure, multiple users can be given different storage space under a single user's account, and they are not necessarily aware of other users who happen to share the same user's account.

A system and method for synchronizing an encrypted file with a remote storage has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer-implemented method comprising:
   providing a portable memory device including a user application, an encryption key, and authentication information, wherein the user application is stored in a general area of the portable memory device that is accessible with a password of the portable memory device, and wherein the encryption key and the authentication information are stored in a hidden area of the portable memory device that is accessible by the user application;
   allowing an access to the user application that is stored in the general area of the portable memory device upon receiving the password of the portable memory device;
   running the user application from the general area of the portable memory device, wherein the user application accesses the authentication information stored in the hidden area of the portable memory device and provides a secure access to an encrypted file that is encrypted with the encryption key and stored in the storage of the cloud storage system;
   launching a process for detecting an update to the encrypted file, wherein the process compares a local copy of the encrypted file stored in a secure area of the portable memory device and the encrypted file stored in the storage of the cloud storage system; and
   synchronizing the local copy of the encrypted file stored in the secure area of the portable memory device and the encrypted file stored in the storage of the cloud storage system.

2. The computer-implemented method of claim 1, wherein the portable memory device is a USB flash drive.

3. The computer-implemented method of claim 2, wherein the USB flash drive contains a hardware encryption chip, and wherein the user application is encrypted using the hardware encryption chip.

4. The computer-implemented method of claim 1, wherein the hidden area of the portable memory device is neither visible to nor accessible by any other application except the user application.

5. The computer-implemented method of claim 1, wherein the local copy of the encrypted file includes a decrypted local copy, and wherein the decrypted local copy of the encrypted file is stored in the secure area of the portable memory device.

6. The computer-implemented method of claim 5, wherein the local copy of the encrypted file further includes an encrypted local copy of the encrypted file, and wherein the encrypted local copy of the encrypted file is stored in the secure area of the portable memory device.

7. The computer-implemented method of claim 1 further comprising:
   decrypting the encrypted file stored in the storage of the cloud storage system; and
   temporarily storing a decrypted copy of the encrypted filed in the secure area of the portable memory device.

8. The computer-implemented method of claim 1, further comprising:
   delivering a control file to the portable memory device and;
   remotely resetting the password of the portable memory device.

9. The computer-implemented method of claim 1, further comprising delivering a control file to the portable memory device via the cloud storage system and destroying the encrypted file during synchronization.

10. The computer-implemented method of claim 1, further comprising automatically launching the user application after providing the password of the portable memory device.

11. A non-transitory computer readable medium having stored thereon computer-readable instructions, which instructions when executed by a processor cause the processor to perform operations comprising:
   providing a portable memory device including a user application, an encryption key, and authentication information, wherein the user application is stored in a general area of the portable memory device that is accessible with a password of the portable memory device, and wherein the encryption key and the authentication information are stored in a hidden area of the portable memory device that is accessible by the user application;

allowing an access to the user application that is stored in the general area of the portable memory device upon receiving the password of the portable memory device;

running the user application from the general area of the portable memory device, wherein the user application accesses the authentication information stored in the hidden area of the portable memory device and provides a secure access to an encrypted file that is encrypted with the encryption key and stored in the storage of the cloud storage system;

launching a process for detecting an update to the encrypted file, wherein the process compares a local copy of the encrypted file stored in a secure area of the portable memory device and the encrypted file stored in the storage of the cloud storage system; and synchronizing the local copy of the encrypted file stored in the secure area of the portable memory device and the encrypted file stored in the storage of the cloud storage system.

12. The non-transitory computer readable medium of claim 11, wherein the portable memory device is a USB flash drive.

13. The non-transitory computer readable medium of claim 12, wherein the USB flash drive contains a hardware encryption chip, and wherein the user application is encrypted using the hardware encryption chip.

14. The non-transitory computer readable medium of claim 11, wherein the hidden area of the portable memory device is neither visible to nor accessible by any other application except the user application.

15. The non-transitory computer readable medium of claim 11, wherein the local copy of the encrypted file includes a decrypted local copy, and wherein the decrypted local copy of the encrypted file is stored in the secure area of the portable memory device.

16. The non-transitory computer readable medium of claim 15, wherein the local copy of the encrypted file further includes an encrypted local copy of the encrypted file, and wherein the encrypted local copy of the encrypted file is stored in the secure area of the portable memory device.

17. The non-transitory computer readable medium of claim 11, wherein the computer-readable instructions, when executed by the processor, cause the processor to perform operations further comprising:
   decrypting the encrypted file stored in the storage of the cloud storage system; and
   temporarily stores a decrypted copy of the encrypted filed in the secure area of the portable memory device.

18. The non-transitory computer readable medium of claim 11, wherein the computer-readable instructions, when executed by the processor, cause the processor to perform operations further comprising:
   delivering a control file to the portable memory device; and
   remotely resetting the password of the portable memory device.

19. The non-transitory computer readable medium of claim 11, wherein the computer-readable instructions, when executed by the processor, cause the processor to perform operations further comprising delivering a control file to the portable memory device via the cloud storage system and destroying the encrypted file during synchronization.

20. The non-transitory computer readable medium of claim 11, wherein the computer-readable instructions, when executed by the processor, cause the processor to perform operations further comprising automatically launching the user application after providing the password of the portable memory device.

* * * * *